(12) United States Patent
Tsutsumi (10) Patent No.: US 10,821,833 B2
(45) Date of Patent: Nov. 3, 2020

(54) VEHICLE POWER-SUPPLY UNIT

(71) Applicant: HONDA MOTOR CO., LTD., Tokyo (JP)

(72) Inventor: Daisuke Tsutsumi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 326 days.

(21) Appl. No.: 15/964,609

(22) Filed: Apr. 27, 2018

(65) Prior Publication Data

US 2018/0312074 A1 Nov. 1, 2018

(30) Foreign Application Priority Data

Apr. 28, 2017 (JP) ................................. 2017-090547

(51) Int. Cl.
*B60L 3/00* (2019.01)
*H01M 10/44* (2006.01)
(Continued)

(52) U.S. Cl.
CPC ............. *B60L 3/0046* (2013.01); *B60L 53/00* (2019.02); *B60L 58/12* (2019.02); *B60L 58/20* (2019.02);
(Continued)

(58) Field of Classification Search
CPC ... H02J 7/342; H02J 7/00; H02J 7/007; B60L 58/20; B60L 58/12; B60L 3/0046;
(Continued)

(56) References Cited

U.S. PATENT DOCUMENTS 5,020,391 A * 6/1991 Aoki ..................... F16H 61/061
477/143
7,839,116 B2 * 11/2010 Esaka ..................... B60L 58/12
320/103
(Continued)

FOREIGN PATENT DOCUMENTS

JP 7-107620 A 4/1995
JP 2010-4628 A 1/2010
(Continued)

OTHER PUBLICATIONS

Office Action dated Feb. 19, 2019, issued in counterpart JP application No. 2017-090547, with English translation. (7 pages).
(Continued)

*Primary Examiner* — M Baye Diao
(74) *Attorney, Agent, or Firm* — Westerman, Hattori, Daniels & Adrian, LLP (57) ABSTRACT

A vehicle power-supply unit includes a high-voltage battery, a low-voltage battery having a lower voltage than the high-voltage battery, and an inlet, and is capable of connecting a feed connector of an external power source to the inlet and supplying electric power from the external power source to a charge target which is at least one of the high-voltage battery and the low-voltage battery. The power-supply unit includes: charge control means that controls charging of the charge target; and a battery voltage sensor that detects a voltage of the low-voltage battery. If a low-voltage battery voltage value VL becomes not higher than a charge abort threshold Vabort while connecting the feed connector to the inlet and supplying electric power from the external power source to the charge target, the charge control means stops supply of electric power from the external power source to the charge target.

6 Claims, 6 Drawing Sheets

(51) Int. Cl.
  *H02J 7/00* (2006.01)
  *B60L 58/12* (2019.01)
  *H01M 10/48* (2006.01)
  *B60L 58/20* (2019.01)
  *H02J 7/34* (2006.01)
  *B60L 53/00* (2019.01)

(52) U.S. Cl.
  CPC .......... *H01M 10/44* (2013.01); *H01M 10/48* (2013.01); *H02J 7/00* (2013.01); *H02J 7/007* (2013.01); *H02J 7/0086* (2013.01); *H02J 7/342* (2020.01); *B60L 2210/10* (2013.01); *H01M 2220/20* (2013.01)

(58) Field of Classification Search
  CPC ...... B60L 2210/10; B60L 58/18; B60L 53/00; B60L 2240/547; H01M 10/48; H01M 10/44; H01M 2220/20
  USPC .......................................................... 320/104
  See application file for complete search history.

(56) References Cited

U.S. PATENT DOCUMENTS

| | | | | |
|---|---|---|---|---|
| 8,723,457 | B2 * | 5/2014 | Komatsu | B60L 50/16 318/139 |
| 8,872,474 | B2 * | 10/2014 | Scheucher | B60K 1/04 320/112 |
| 9,231,410 | B2 * | 1/2016 | Wojcik | H02J 7/0042 |
| 9,431,832 | B2 * | 8/2016 | Ichikawa | H02J 7/0016 |
| 9,827,869 | B2 * | 11/2017 | Chauvelier | B60L 58/12 |
| 10,011,184 | B2 * | 7/2018 | Mitsutani | B60L 58/14 |
| 10,300,999 | B2 * | 5/2019 | Maejima | B60L 50/15 |
| 2006/0029846 | A1 * | 2/2006 | Konoto | H01M 8/04082 429/415 |
| 2014/0103883 | A1 * | 4/2014 | Mitsutani | B60L 3/04 320/162 |
| 2014/0285135 | A1 * | 9/2014 | Ji | H02J 7/00711 320/103 |
| 2016/0016483 | A1 * | 1/2016 | Yasunori | B60L 50/40 320/162 |
| 2016/0089981 | A1 * | 3/2016 | Kodawara | B60L 58/24 307/10.1 |
| 2017/0264108 | A1 * | 9/2017 | Ito | H02J 7/0013 |

FOREIGN PATENT DOCUMENTS

| | | |
|---|---|---|
| JP | 2010-098845 A | 4/2010 |
| JP | 2010-239670 A | 10/2010 |
| JP | 2012-217292 A | 11/2012 |
| JP | 2012-240665 A | 12/2012 |
| JP | 2013-189075 A | 9/2013 |
| JP | 2014-082875 A | 5/2014 |
| JP | 2015-023748 A | 2/2015 |
| JP | 2016-134969 A | 7/2016 |
| WO | 2017/022572 A1 | 2/2017 |

OTHER PUBLICATIONS

Office Action dated Sep. 11, 2018, issued in counterpart Japanese Application No. 2017-090547. (5 pages).

* cited by examiner

VEHICLE POWER-SUPPLY UNIT

CROSS-REFERENCE OF RELATED APPLICATION

This application claims priority of Japanese Patent Application No. 2017-090547 filed in Japan on Apr. 28, 2017, the entire contents of which are incorporated herein by reference.

TECHNICAL FIELD

The present invention relates to a vehicle power-supply unit. More specifically, the invention relates to a vehicle power-supply unit that can supply electric power to at least one of two electric storage devices as a charge target, from an external power supply source.

BACKGROUND OF THE INVENTION

An electric vehicle that travels by use of electric power stored in a battery often includes two types of batteries, which are a high-voltage battery for mainly supplying electric power to a driving motor and air-conditioning equipment, for example, and a low-voltage battery for supplying electric power to so-called accessories such as lights, a navigation system, and an electronic control unit. These batteries are charged by an on-board generator when the vehicle is running, and are charged by connecting the vehicle with an external power supply source such as a normal charge facility and a quick-charge facility when the vehicle is stopped.

Japanese Patent Application Publication No. 2010-239670 discloses a technique in which, while charging a high-voltage battery and a low-voltage battery by use of an external power supply source, if an anomaly occurs in the low-voltage battery and its voltage drops, the external charging is continued by performing fail-safe processing where the charging voltage applied to the low-voltage battery is reduced from a normal level. The technique of Japanese Patent Application Publication No. 2010-239670 can prevent application of an excessive charging voltage to a low-voltage battery in which an anomaly has occurred.

In a low-voltage battery or during external charging, if an anomaly occurs in a power converter or the like for reducing the voltage of electric power supplied from an external power supply source and supplying it to the low-voltage battery, the voltage of the low-voltage battery may continue to fall even if the fail-safe processing of Japanese Patent Application Publication No. 2010-239670 is performed.

When terminating external charging, various charge stop processing are performed, such as processing for communication between the external charging facility and the vehicle, and processing for releasing a lock between a connector of the external charging facility and an inlet of the vehicle, for example. Many of these charge stop processing require electric power of the low-voltage battery. However, as mentioned earlier, if an anomaly occurs in the low-voltage battery or its power converter or the like, and the voltage of the low-voltage battery continues to fall while performing external charging, it may no longer be able to appropriately perform the charge stop processing using electric power of the low-voltage battery.

SUMMARY OF THE INVENTION

In one aspect of the present invention, a vehicle power-supply unit is provided which can ensure voltage in a low-voltage battery required to perform charge stop processing for terminating external charging, even when some defect occurs in the low-voltage battery while performing external charging of the low-voltage battery and a high-voltage battery by use of an external power supply source.

(1) A vehicle (e.g., later-mentioned vehicle V) power-supply unit (e.g., later-mentioned power-supply unit 1) includes a first electric storage device (e.g., later-mentioned high-voltage battery 2 or a first capacitor), a second electric storage device (e.g., later-mentioned low-voltage battery 3 or a second capacitor) having a lower voltage than the first electric storage device, and an inlet (e.g., later-mentioned inlet 51), the power-supply unit is capable of connecting a connector (e.g., later-mentioned feed connector 83) of an external power supply source (e.g., later-mentioned external power source 80) to the inlet and supplying electric power from the external power supply source to a charge target which is at least any one of the first electric storage device and the second electric storage device. The power-supply unit includes: charge control means (e.g., a charge controller such as later-mentioned charge ECU 60 and battery ECU 62) that controls charging of the charge target; and voltage detection means (e.g., a voltage detector such as later-mentioned battery voltage sensor 33) that detects a voltage of the second electric storage device. If a voltage value of the second electric storage device (e.g., later-mentioned low-voltage battery voltage value VL) becomes not higher than a predetermined charge stop threshold (e.g., later-mentioned charge abort threshold Vabort) while connecting the connector to the inlet and supplying electric power from the external power supply source to the charge target, the charge control means stops supply of electric power from the external power supply source to the charge target.

(2) In this case, the power-supply unit further includes a lock mechanism (e.g., later-mentioned connector locking mechanism 53) capable of switching, by driving an electromagnetic actuator (e.g., later-mentioned lock motor 533), between a locked state in which movement of the connector in a pullout direction (e.g., later-mentioned pullout direction 832) is restricted with the connector connected to the inlet, and an unlocked state in which the movement is not restricted. The charge control means preferably drives the electromagnetic actuator by use of electric power of the second electric storage device, to perform lock processing (e.g., later-mentioned connector lock processing of S2 in FIG. 4) of switching from the unlocked state to the locked state, or lock release processing (e.g., later-mentioned connector lock release processing of S34 in FIG. 5) of switching from the locked state to the unlocked state.

(3) In this case, when a voltage value of the second electric storage device becomes not higher than the charge stop threshold, the charge control means preferably stops supply of electric power from the external power supply source to the charge target, and then performs the lock release processing.

(4) In this case, the power-supply unit further includes: a power converter (e.g., later-mentioned DC/DC converter 32) that converts input electric power and supplies it to the second electric storage device; and anomaly detection means (e.g., an anomaly detector such as later-mentioned charge ECU 60) that detects an anomaly in the power converter. Even when an anomaly is detected in the power converter while supplying electric power from the external power supply source to the charge target, the charge control means preferably continues to supply electric power from the external power supply source to the charge target, as long as a voltage value of the second electric storage device is larger than the charge stop threshold.

(5) In this case, the power-supply unit further includes: a first power line (e.g., later-mentioned first power lines $21p$, $21n$) that connects the external power supply source and the first electric storage device; and a second power line (e.g., later-mentioned second power lines $31p$, $31n$) that connects the first power line and the second electric storage device. The power converter is preferably provided in the second power line.

(6) In this case, electric power of the first electric storage device is preferably supplied to the second electric storage device through the power converter.

EFFECT OF THE INVENTION (1) When the connector of the external power supply source is connected to the inlet and electric power is supplied to at least one of the first electric storage device and the second electric storage device as a charge target, if a voltage value of the second electric storage device becomes not higher than the charge stop threshold, the power-supply unit of the present invention stops the supply of electric power from the external power supply source to the charge target. With this, if some defect occurs in the second electric storage device and its voltage value drops while performing external charging by use of the external power supply source, it is possible to stop the external charging of the charge target before the voltage value of the second electric storage device drops largely below the charge stop threshold. Hence, according to the present invention, even if some defect occurs in the second electric storage device or its peripheral equipment and the voltage value of the second electric storage device decreases, the external charging can be stopped with at least a voltage of about the charge stop threshold ensured in the second electric storage device. Accordingly, after stoppage of the external charging, charge stop processing can be performed appropriately by using the electric power of the second electric storage device.

(2) The power-supply unit of the present invention includes the lock mechanism that can, by driving the electromagnetic actuator, switch between a locked state in which movement of the connector in the pullout direction is restricted, and an unlocked state in which this movement is not restricted. This can prevent the connector from being unintentionally pulled out from the inlet while connecting the connector to the inlet and performing external charging of the charge target. The power-supply unit of the invention also drives the electromagnetic actuator by use of the electric power of the second electric storage device, to perform lock processing of switching from the unlocked state to the locked state or lock release processing of switching from the locked state to the unlocked state. In a case of performing the lock processing or the lock release processing by use of electric power of the first electric storage device having a higher voltage than the second electric storage device, the voltage of the first electric storage device needs to be stepped down, and power loss may increase. Meanwhile, the power-supply unit of the invention can suppress power loss from performing the lock processing and the lock release processing. Also, as described above, in the power-supply unit of the invention, a voltage of about the charge stop threshold can be ensured, even when the voltage of the second electric storage device drops during external charging. Hence, according to the power-supply unit of the invention, even when some defect occurs in the second electric storage device or its peripheral equipment, the lock processing and lock release processing can be performed appropriately, whereby convenience can be increased. Accordingly, the power-supply unit of the invention can improve convenience while suppressing power loss.

(3) When the voltage value of the second electric storage device becomes not higher than the charge stop threshold during external charging, the power-supply unit of the present invention stops the supply of electric power from the external power supply source to the charge target, and then performs lock release processing. According to the power-supply unit of the invention, by performing the lock release processing in this order, it is possible to prevent the connector from being pulled out from the inlet with electric power still supplied from the external power supply source to the charge target. Additionally, according to the power-supply unit of the invention, even when the voltage of the second electric storage device drops during external charging, a voltage of about the charge stop threshold can be ensured at the time of stoppage of the external charging. Hence, after the stoppage of external charging, there is no fear of being unable to perform the lock release processing appropriately and being unable to pull out the connector from the inlet.

(4) Even when an anomaly occurs in the power converter that supplies electric power to the second electric storage device during external charging, the power-supply unit of the present invention continues without stopping the external charging of the charge target as long as the voltage value of the second electric storage device is larger than the charge stop threshold. In other words, in the power-supply unit of the invention, even when an anomaly occurs in the power converter that supplies electric power to the second electric storage device, external charging of the first electric storage device can be continued, as long as the voltage value of the second electric storage device is larger than the charge stop threshold.

(5) The power-supply unit of the present invention connects the external power supply source and the first electric storage device by the first power line, connects the first power line and the second electric storage device by the second power line, and has the aforementioned power converter provided in the second power line. With this configuration, electric power can be supplied to the second electric storage device from the external power supply source or the first electric storage device through the power converter. In addition, since the power converter is provided in this position, charging of the first electric storage device can be continued even if an anomaly occurs in the power converter during external charging.

(6) In the power-supply unit of the present invention, electric power from the first electric storage device having a higher voltage than the second electric storage device is supplied to the second electric storage device through the power converter. Hence, when the remaining capacity of the second electric storage device decreases, the second electric storage device can be appropriately charged by supplying electric power from the first electric storage device.

DETAILED DESCRIPTION OF EMBODIMENTS OF THE INVENTION

Hereinafter, an embodiment of the present invention will be described with reference to the drawings.

Figure 1:
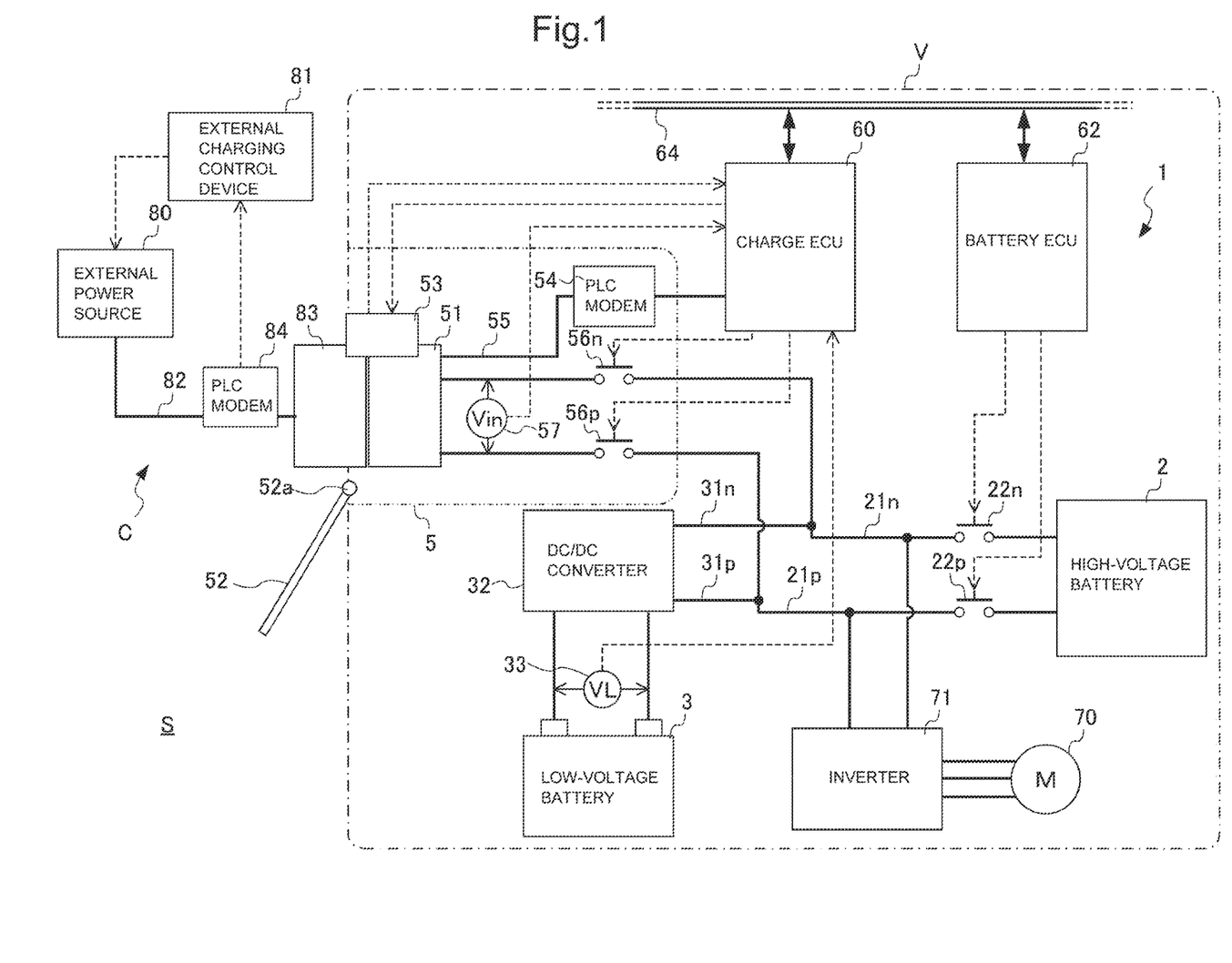
FIG. 1 is a diagram illustrating a configuration of a vehicle including a power-supply unit of an embodiment of the present invention and a charging system of the vehicle.

FIG. 1 is a diagram illustrating a configuration of an electric vehicle V (hereinafter simply referred to as "vehicle V") including a power-supply unit 1 of the embodiment, and its charging system S. The charging system S is configured by combining the vehicle V with an external charger C.

The external charger C includes an external power source 80 that outputs direct current, an external charging control device 81 that controls output of the external power source 80, a feed connector 83 that is connected to the external power source 80 through a power line 82, and a PLC modem 84 for performing PLC communication which is communication via the power line 82.

The external charging control device 81 performs PLC communication, through the PLC modem 84, with a later-mentioned charge ECU 60 mounted on the vehicle V, and controls output of the power source 80 based on information acquired by the PLC communication.

When the user charges later-mentioned batteries 2, 3 mounted on the vehicle V by use of the external charger C, he/she connects the feed connector 83 to a later-mentioned inlet 51 provided in the vehicle V. When the feed connector 83 is connected to the inlet 51, first, the power line 82 on the external charger C side and a later-mentioned communication line 55 on the vehicle V side are electrically connected. This enables PLC communication in which control pilot signals (hereinafter referred to as "CPLT signals") are exchanged between the external charger C and the vehicle V.

A CPLT signal is a pulse signal including information necessary for performing external charging between the external charger C and the vehicle V, such as information on whether or not it is possible to supply electric power from the power source 80 to the vehicle V side, information on the rated current of the external power source 80, information on the required charged capacity on the vehicle V side, and information on a charge stop request from the vehicle V side.

After PLC communication between the external charger C and the vehicle V is enabled in the above manner, later-mentioned main contactors 22p, 22n of the vehicle V are turned on based on the PLC communication, and then feed contactors 56p, 56n are turned on. Thus, the power line 82 on the external charger C side and first power lines 21p, 21n on the vehicle V side are electrically connected. This enables supply of electric power (hereinafter also simply referred to as "external charging") from the power source 80 of the external charger C to the batteries 2, 3 of the vehicle V.

The vehicle V includes a driving motor 70 mechanically connected to an unillustrated driving wheel, an inverter 71 connected to the driving motor 70, and the power-supply unit 1 as a power supply source of the driving motor 70, the inverter 71, and electric equipment mounted on the vehicle V.

The driving motor 70 is a three-phase AC motor, for example. The driving motor 70 generates driving force, when it receives electric power from the high-voltage battery 2 through the inverter 71. The driving motor 70 generates electric power by performing regenerative operation. The electric power generated by regenerative operation of the driving motor 70 is supplied to the high-voltage battery 2 and the low-voltage battery 3 of the power-supply unit 1 through the inverter 71, and charges the batteries 2, 3.

The inverter 71 is connected to the later-mentioned first power lines 21p, 21n, converts direct current supplied from the high-voltage battery 2 through the first power lines 21p, 21n into three-phase alternating current, and supplies it to the driving motor 70. During regenerative operation of the driving motor 70, the inverter converts alternating current supplied from the driving motor 70 into direct current, and supplies it to the high-voltage battery 2 and the low-voltage battery 3.

The power-supply unit 1 includes the high-voltage battery 2, the low-voltage battery 3 having a lower voltage than the high-voltage battery 2, an external charging unit 5 to which the external charger C is connected, the positive-side first power line 21p and the negative-side first power line 21n (hereinafter collectively referred to as "first power lines 21p, 21n") connecting the external charging unit 5 and the high-voltage battery 2, a positive-side second power line 31p and a negative-side second power line 31n (hereinafter collectively referred to as "second power lines 31p, 31n") connecting the first power line 21p, 21n and the low-voltage battery 3, a DC/DC converter 32 provided in the second power lines 31p, 31n, and the charge ECU 60 and a battery ECU 62 for controlling external charging of the batteries 2, 3.

The high-voltage battery 2 is a secondary battery capable of both discharging in which chemical energy is converted into electric energy, and charging in which electric energy is converted into chemical energy. The following description is given by using, as the high-voltage battery 2, a so-called lithium ion battery that is charged and discharged by lithium ions moving between electrodes. However, the present invention is not limited to this.

The positive-side main contactor 22p and the negative-side main contactor 22n (hereinafter collectively referred to as "main contactors 22p, 22n") that connect and disconnect the first power lines 21p, 21n are provided in the first power lines 21p, 21n extending from the high-voltage battery 2 to the external charging unit 5, at parts closer to the high-voltage battery 2 than parts where the second power lines 31p, 31n and the inverter 71 are connected.

The main contactors 22p, 22n are normally-open types that are open when no instruction signal is input thereinto from outside. The main contactors 22p, 22n close in response to an instruction signal from the battery ECU 62. More specifically, when charging and discharging is performed between the high-voltage battery 2 and the inverter 71 during travel of the vehicle V, for example, in a case of performing external charging of the high-voltage battery 2 by supplying electric power from the external charger C to the high-voltage battery 2, or charging the low-voltage battery by supplying electric power of the high-voltage battery 2 to the low-voltage battery 3, for example, the main contactors 22p, 22n close in response to an instruction signal from the battery ECU 62.

As in the case of the aforementioned high-voltage battery 2, the low-voltage battery 3 is a secondary battery capable of both discharging and charging. The following description is given by using, as the low-voltage battery 3, a lead-acid battery that uses lead for electrodes. However, the present invention is not limited to this.

Note that a high-voltage battery 2 and a low-voltage battery 3 having different characteristics are used. More specifically, a high-voltage battery 2 having a higher output voltage and power density and larger battery capacity than the low-voltage battery 3 is used.

The DC/DC converter 32 steps up or steps down the output voltage on the first power lines 21*p*, 21*n* side or the low-voltage battery 3 side.

A battery voltage sensor 33 that detects the voltage between positive and negative terminals of the low-voltage battery 3 is provided in the second power lines 31*p*, 31*n* in a part closer to the low-voltage battery 3 than the DC/DC converter 32. The battery voltage sensor 33 transmits a detection signal according to a voltage value VL between the positive and negative terminals of the low-voltage battery 3, to the charge ECU 60 and the battery ECU 62.

The external charging unit 5 includes the inlet 51 that is connectable to the feed connector 83, a charge lid 52 that protects the inlet 51, a connector locking mechanism 53 that restricts movement of the feed connector 83 connected to the inlet 51, a PLC modem 54 for performing PLC communication between the external charging control device 81 and the charge ECU 60, the communication line 55 that connects the PLC modem 54 and the inlet 51, the positive-side feed contactor 56*p* and the negative-side feed contactor 56*n* (hereinafter collectively referred to as "feed contactors 56*p*, 56*n*") provided in the first power lines 21*p*, 21*n*, and an inlet voltage sensor 57 that detects the voltage between positive and negative terminals of the inlet 51. The external charging unit 5 is provided in a side part of the vehicle V.

Terminals of the first power lines 21*p*, 21*n*, and communication line 55 are provided in the inlet 51. When the feed connector 83 is connected to the inlet 51, the power line 82 on the external charger C side and the first power lines 21*p*, 21*n* and the communication line 55 on the vehicle V side are electrically connected. This enables supply of electric power from the power source 80 of the external charger C to the batteries 2,3 of the vehicle V, and mutual PLC communication between the external charging control device 81 of the external charger C and the charge ECU 60 of the vehicle V.

The charge lid 52 is plate-shaped, and is pivotally supported in an openable manner by a hinge 52*a* provided in an unillustrated vehicle body of the vehicle V. When the charge lid 52 is closed, it constitutes apart of an outer panel of the vehicle V, and protects the inlet 51. When the charge lid 52 is opened, the inlet 51 is exposed to the outside, so that the user can connect the feed connector 83 to the inlet 51.

The feed contactors 56*p*, 56*n* are provided in the first power lines 21*p*, 21*n* in parts closer to the inlet 51 than parts where the second power lines 31*p*, 31*n* and the inverter 71 are connected, and connect and disconnect the first power lines 21*p*, 21*n*. The feed contactors 56*p*, 56*n* are normally-open types that are open when no instruction signal is input thereinto from outside. The feed contactors 56*p*, 56*n* close in response to an instruction signal from the charge ECU 60. More specifically, when external charging of the batteries 2,3 is performed by connecting to the feed connector 83 to the inlet 51, for example, the feed contactors 56*p*, 56*n* close in response to an instruction signal from the charge ECU 60.

The inlet voltage sensor 57 is provided in the first power lines 21*p*, 21*n* in a part closer to the inlet 51 than the feed contactors 56*p*, 56*n*. The inlet voltage sensor 57 transmits a detection signal according to a voltage value Vin between positive and negative terminals of the inlet 51, to the charge ECU 60.

Next, a connection structure between the feed connector 83 and the inlet 52 is described with reference to FIGS. 2 and 3.

Figure 2:
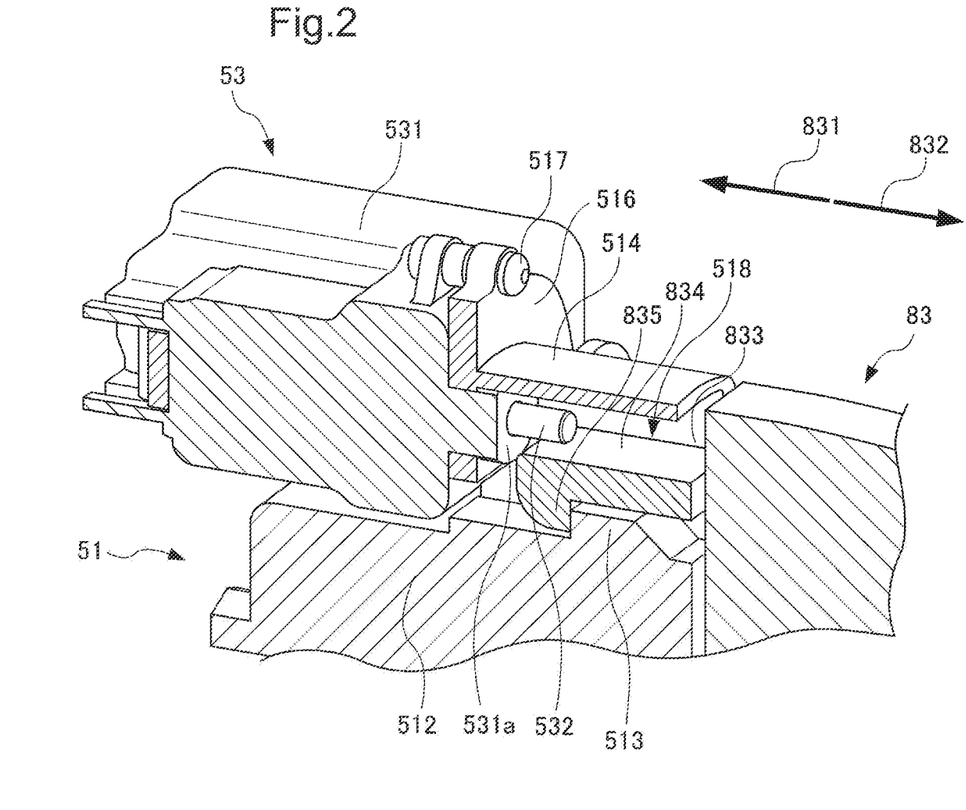
FIG. 2 is a cross-sectional view of a feed connector and an inlet connected to each other.

FIG. 2 is a cross-sectional view of the feed connector 83 and the inlet 51. FIG. 2 is a cross-sectional view of a part of the feed connector 83 and the inlet 51 connected to each other, along a plane parallel to an insertion direction 831 and a pullout direction 832 of the feed connector 83.

The feed connector 83 has a plate-shaped connector latch 834 that extends while protruding to the inlet 51 side, from a tip end face 833 thereof that faces the inlet 51 at the time of connection. A claw portion 835 protruding downward in FIG. 2 is provided in a tip end part of the connector latch 834. Note that an unillustrated release switch that the user operates when pulling out the feed connector 83 from the inlet 51 is provided in the feed connector 83. Note that when the release switch is pressed, the tip end part of the connector latch 834 curves upward in FIG. 2.

The inlet 51 includes a columnar terminal portion 512 that protects terminals of the first power lines 21*p*, 21*n* and the communication line 55 (see FIG. 1), a protrusion 513 provided above the terminal portion 512 in FIG. 2, and a protection cover 514 that covers the terminal portion 512 from above in FIG. 2. A gap is formed between the protection cover 514 and the terminal portion 512, and serves as a latch insertion portion 518 into which the connector latch 834 is inserted when the feed connector 83 is connected to the inlet 51. Of the protection cover 514, a base end portion 516 on the opposite side of the feed connector 83 is formed into a flange shape, and the box-shaped connector locking mechanism 53 is attached to the base end portion 516 with a screw 517.

The connector locking mechanism 53 includes a bar-like lock pin 532 that is freely projectable from and retractable into a tip end face 531*a* of a case 531 thereof. The lock pin 532 can be projected to the inside of the latch insertion portion 518 from the tip end face 531*a*, and be retracted to the tip end face 531*a* side, by a mechanism to be described below with reference to FIG. 3. Note that FIG. 2 illustrates a state where the lock pin 532 is projected to the inside of the latch insertion portion 518.

The procedure of connecting the feed connector 83 to the inlet 51 and locking the feed connector 83 by the connector locking mechanism 53 is as follows. First, the user inserts the feed connector 83 into the inlet 51 along the insertion direction 831. Then, terminals of the power line 82 (see FIG. 1) provided in the feed connector 83 come into contact with terminals of the first power lines 21*p*, 21*n* and the communication line 55 (see FIG. 1), and the claw portion 835 formed on the tip end part of the connector latch 834 engages with the protrusion 513 provided in the inlet 51. After the feed connector 83 and the inlet 51 are connected in this manner, the connector locking mechanism 53 projects the lock pin 532 to the inside of the latch insertion portion 518. Then, as illustrated in FIG. 2, the tip end part of the lock pin 532 engages with an upper face of the tip end part of the connector latch 834. This locks the feed connector 83 and restricts its movement in the pullout direction 832, while it is connected to the inlet 51. Note that since the tip end part of the connector latch 834 is sandwiched between the protrusion 513 and the lock pin 532 in this locked state, the claw portion 835 of the connector latch 834 cannot be released from the protrusion 513 even when the aforementioned release switch is pressed.

Next, the procedure of releasing the locked state of the feed connector 83 and pulling out the feed connector 83 from the inlet 51 is as follows. First, the connector locking mechanism 53 retracts the lock pin 532 to the tip end face 531a side. Then, the tip end part of the lock pin 532 moves away from the upper face of the tip end part of the connector latch 834. This unlocks the feed connector 83 and releases the restriction of its movement in the pullout direction 832, while it is connected to the inlet 51. After unlocking the feed connector, the user presses the release switch in the feed connector 83 to release the claw portion 835 of the connector latch 834 from the protrusion 513, and then pulls out the feed connector 83 from the inlet 51 along the pullout direction 832.

Figure 3:
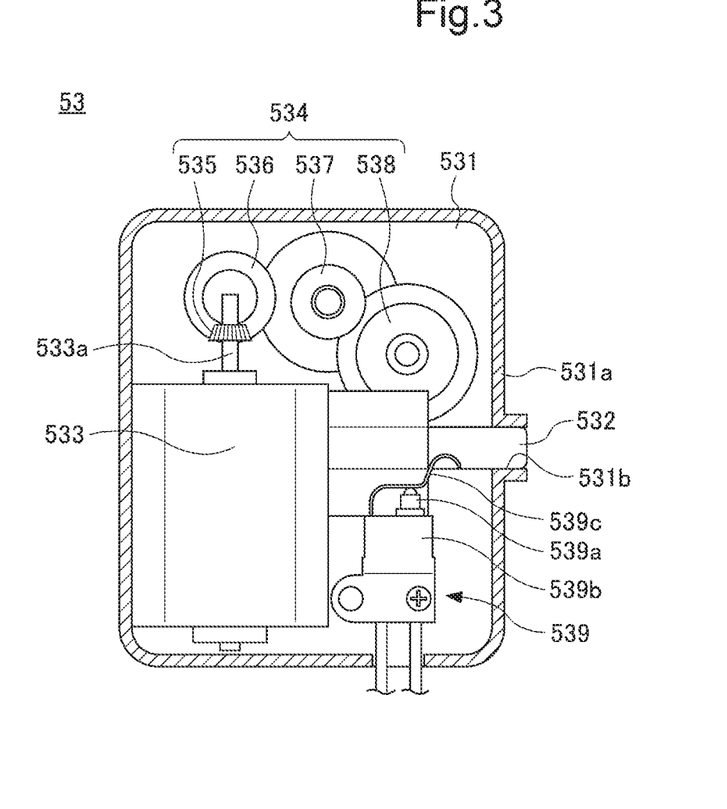
FIG. 3 is a diagram illustrating an internal configuration of a connector locking mechanism.

FIG. 3 is a diagram illustrating an internal configuration of the case 531 of the connector locking mechanism 53.

The connector locking mechanism 53 includes the lock pin 532, a lock motor 533, a power transmission device 534 that moves the lock pin 532 forward and rearward by a rotary force generated by the lock motor 533, a pin position sensor 539 that detects the position of the lock pin 532, and the box-shaped case 531 that stores these parts.

The lock motor 533 is a DC motor, for example. The lock motor 533 rotates its shaft 533a in a normal or reverse direction depending on an instruction signal from the charge ECU 60. The lock pin 532 is provided in a freely projectable and retractable manner in a through hole 531b formed in the tip end face 531a of the case 531.

The power transmission device 534 includes a first bevel gear 535 provided in the shaft 533a of the lock motor 533, a second bevel gear 536 that meshes with the first bevel gear 535, a third pinion gear 537 that meshes with a pinion gear provided in the second bevel gear 536, a fourth pinion gear 538 that meshes with the third pinion gear 537, and a rack gear (not shown) that meshes with the fourth pinion gear 538 and is provided in a base end part of the lock pin 532. Hence, in the connector locking mechanism 53, a normal rotation of the lock motor 533 rotates the second bevel gear 536 anticlockwise in FIG. 3, projects the lock pin 532 from the tip end face 531a, and creates a locked state. Meanwhile, a reverse rotation of the lock motor 533 rotates the second bevel gear 536 clockwise in FIG. 3, retracts the lock pin 532 to the tip end face 531a side, and creates an unlocked state.

The pin position sensor 539 is a limit switch including a switch case 539b in which a plunger 539a is provided in a freely projectable and retractable manner, a switch (not shown) provided inside the switch case 539b, and a lever 539c provided in a side part on the plunger 539a side of the switch case 539b.

When the locked pin 532 projects from the tip end face 531a and creates a locked state, the lever 539c of the pin position sensor 539 tilts to the switch case 539b side, presses the plunger 539a toward the switch case 539b, and turns on the switch inside the switch case 539b to transmit a "low" signal indicating the locked state to the charge ECU 60. Meanwhile, when the lock pin 532 retracts to the tip end face 531a side and creates an unlocked state, the lever 539c of the pin position sensor 539 moves away from the switch case 539b side, so that the plunger 539a is projected from the switch case 539b by an unillustrated spring. This turns off the switch inside the switch case 539b to transmit a "high" signal indicating the unlocked state to the charge ECU 60. The charge ECU 60 uses the signal from the pin position sensor 539 to determine whether the connector is locked or unlocked.

Referring back to FIG. 1, the charge ECU 60 is a microcomputer including: an I/O interface that performs A/D conversion on detection signals of various sensors; a RAM and a ROM that store various programs such as PLC communication processing between the external charging control device 81 and the charge ECU, and later-mentioned external charging control processing of FIG. 4 and external charging abort processing of FIG. 5; a CPU that executes various processing according to the programs; and a drive circuit that controls energization of various actuators depending on the processing result of the CPU.

The battery ECU 62 is a microcomputer including: an I/O interface that performs A/D conversion on detection signals of various sensors; a RAM and a ROM that store various programs; a CPU that executes various processing according to the programs; and a drive circuit that controls energization of various actuators depending on the processing result of the CPU.

These controllers such as the charge ECU 60 and the battery ECU 62 are mutually connected through a CAN bus 64, which is a bus-type network for exchanging various control information, and are capable of exchanging necessary control information therebetween.

The high-voltage battery 2 has sensors (not shown) for detecting its cell voltage, output voltage, and temperature, for example. The low-voltage battery 3 has sensors (not shown) for detecting its output current and temperature, for example, in addition to the aforementioned battery voltage sensor 33.

The battery ECU 62 monitors the charging rate (the rate of a remaining battery capacity to the fully charged capacity expressed as a percentage, hereinafter referred to as "SOC (State Of Charge)" of the batteries 2, 3, based on detection signals of the sensors detecting the states of the high-voltage battery 2 and the low-voltage battery 3.

Figure 4:
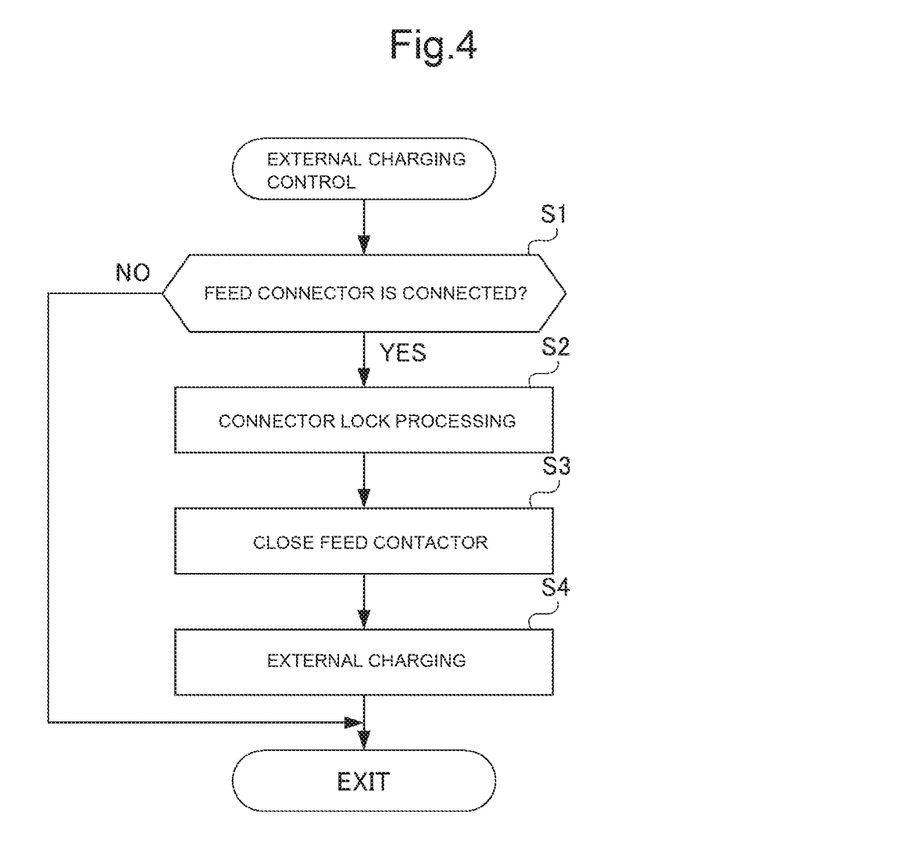
FIG. 4 is a flowchart illustrating a specific procedure of external charging control processing.

FIG. 4 is a flowchart illustrating a specific procedure of external charging control processing. The processing of FIG. 4 is executed by the charge ECU 60 and the battery ECU 62, when the user performs a preliminary operation (e.g., operation of opening the charge lid 52) for performing external charging by use of the external charger C while the vehicle is stopped, for example.

First, in S1, the charge ECU 60 determines whether the feed connector 83 is connected to the inlet 51. If it is determined NO in S1, the charge ECU 60 terminates the processing, and repeats the processing of S1 after passage of a predetermined time. If it is determined YES in S1, the processing proceeds to S2.

In S2, the charge ECU 60 rotates the lock motor 533 in the normal direction by use of electric power of the low-voltage battery 3, performs connector lock processing in which the connector locking mechanism 53 is switched from the unlocked state to the locked state, and proceeds to S3. This can prevent the feed connector 83 from being unintentionally pulled out from the inlet 51, while performing external charging. Next, in S3, the charge ECU 60 closes the feed contactors 56p, 56n, and the processing proceeds to S4. This connects the power source 80 of the external charger C and the batteries 2, 3 of the vehicle V, and enables external charging of the batteries 2, 3.

In S4, the charge ECU 60 acquires the SOC of the high-voltage battery 2 and the low-voltage battery 3 from the battery ECU 62, selects, according to the SOC of each battery, at least one of the batteries 2, 3 as a charge target, and performs external charging processing in which electric power from the power source 80 is supplied to the selected charge target. Here, if the charge target includes the high-voltage battery 2, the battery ECU 62 closes the main contactors 22p, 22n, supplies electric power from the power source 80 to the high-voltage battery 2, and charges the battery.

On the other hand, if the charge target includes the low-voltage battery 3, the charge ECU 60 drives the DC/DC converter 32, steps down the electric power from the power source 80 to supply it to the low-voltage battery 3, and charges the battery. Also, while performing external charging of the low-voltage battery 3, the charge ECU 60 detects whether there is an anomaly in the DC/DC converter 32. More specifically, the charge ECU 60 compares the voltage value and/or the current value on the input side of the DC/DC converter 32 with the voltage value and/or the current value on the output side thereof, and determines that an anomaly has occurred in the DC/DC converter 32 when the output-side value relative to the input-side value exceeds a preset range. Then, upon detection of an anomaly in the DC/DC converter 32 while performing external charging of the low-voltage battery 3, the charge ECU 60 stops driving the DC/DC converter 32, for example, to interrupt energization between the power source 80 and the low-voltage battery 3, and stops supply of electric power to the low-voltage battery 3. Note that as described earlier, electric power from the power source 80 may be supplied to the high-voltage battery 2 without passing through the DC/DC converter 32. Hence, it is preferable that supply of electric power to the high-voltage battery 2 be continued, even when an anomaly is detected in the DC/DC converter 32.

Note that the external charging processing of S4 is continued until the charging reaches a charging capacity determined on the basis of PLC communication between the charge ECU 60 and the external charging control device 81, or until the external charging processing is forcibly terminated by external charging abort processing described below.

Figure 5:
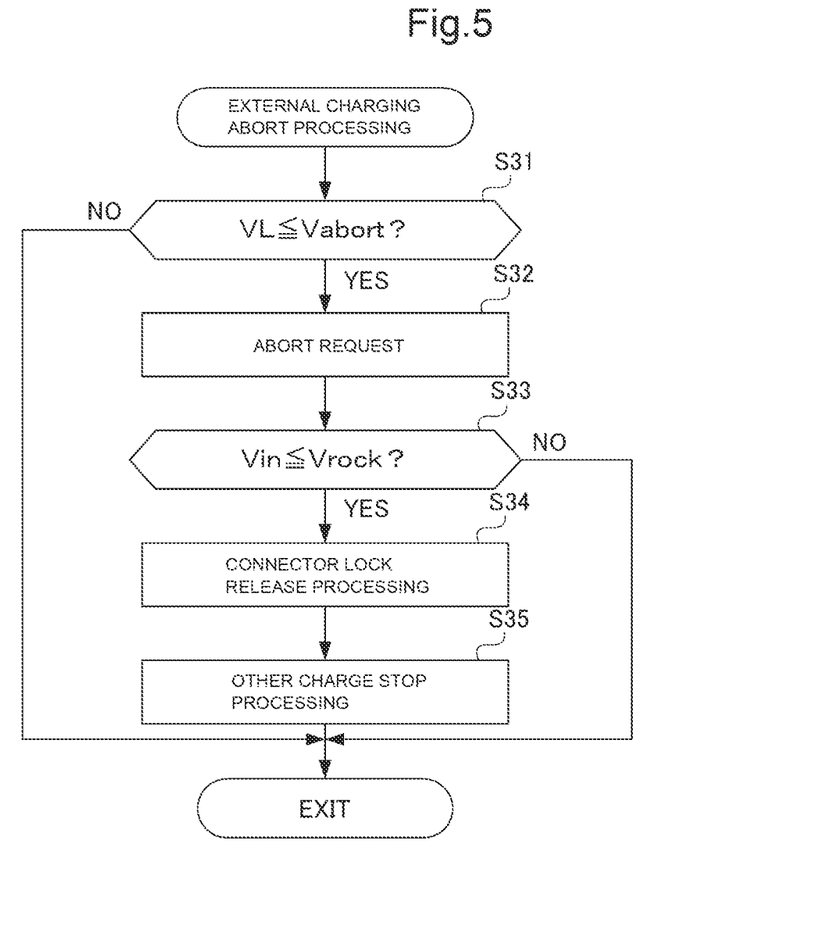
FIG. 5 is a flowchart illustrating a specific procedure of external charging abort processing.

FIG. 5 is a flowchart illustrating a specific procedure of external charging abort processing. The processing of FIG. 5 is repeated by the charge ECU 60 at a predetermined cycle while performing the aforementioned external charging control processing in S4, that is, while supplying electric power from the external power source to the charge target.

In S31, the charge ECU 60 acquires the current low-voltage battery voltage value VL based on the detection signal of the battery voltage sensor 33, and determines whether the low-voltage battery voltage value VL is not higher than a predetermined charge abort threshold Vabort. If it is determined NO in S31, the charge ECU 60 terminates the processing, and repeats the processing of S31 after passage of a predetermined time. If it is determined YES in S31, the processing proceeds to S32. Here, the aforementioned charge abort threshold Vabort is set to a total of the minimum operating voltage of the lock motor 533 and a predetermined positive margin value (Vabort=minimum operating voltage of lock motor 533+margin value). Accordingly, if it is determined YES in S31, the low-voltage battery voltage value VL is coming closer to the minimum operating voltage of the lock motor 533, and if this state is left unattended, the low-voltage battery voltage value VL may drop below the minimum operating voltage in a reasonably short time.

In S32, in order to stop the supply of electric power from the power source 80 to the charge target, the charge ECU 60 uses PLC communication to transmit, to the external charging control device 81, a PLCT signal requesting to stop the supply of electric power from the power source 80 (abort request). Upon receipt of the abort request from the charge ECU 60, the external charging control device 81 reduces the output voltage of the power source 80 to zero.

In S33, the charge ECU 60 acquires a current inlet end voltage value Vin based on the detection signal of the inlet voltage sensor 57, and determines whether the inlet end voltage value Vin is not higher than a lock release threshold Vrock set to a slightly larger value than zero. If it is determined NO in S33, the charge ECU 60 terminates the processing, and repeats the processing of S31 after passage of a predetermined time. If it is determined YES in S33, the charge ECU 60 determines that supply of electric power from the power source 80 to the charge target is stopped, and the processing proceeds to S34.

In S34, the charge ECU 60 rotates the lock motor 533 in the reverse direction by use of electric power of the low-voltage battery 3, performs connector lock release processing in which the connector locking mechanism 53 is switched from the locked state to the unlocked state, and proceeds to S35. From this point forward, the user can pull out the feed connector 83 from the inlet 51. In the connector lock release processing, in order to surely release the lock on the feed connector 83 by the connector locking mechanism 53, it is preferable that the charge ECU 60 continue rotating the lock motor 533 in the reverse direction by inputting, to the driver of the lock motor 533, instruction signals for driving the lock motor 533 in the reverse direction, until anyone of the following release termination conditions is met.

A first release termination condition is switching of the signal level of the pin position sensor 539 from "low" indicating a locked state to "high" indicating an unlocked state, and passage of a predetermined instruction continuation time after release detection. Upon detection that the first release termination condition is met after starting rotation of the lock motor 533 in the reverse direction, the charge ECU 60 determines that the lock on the feed connector 83 by the connector locking mechanism 53 is released, and terminates the reverse rotation of the lock motor 533.

A second release termination condition is passage of a predetermined release instruction continuation time, after starting the reverse rotation of the lock motor 533. In order to surely release the lock regardless of the state of the pin position sensor 539, it is preferable that the release instruction continuation time be set sufficiently longer than the average time required to satisfy the first release termination condition. Even if the signal level of the pin position sensor 539 does not switch from "low" to "high" for some reason, upon detection that the second release termination condition is met, the charge ECU 60 determines that the lock on the feed connector 83 by the connector locking mechanism 53 is released, and terminates the reverse rotation of the lock motor 533.

In S35, the charge ECU 60 performs charge stop processing other than the aforementioned connector lock release processing by use of electric power of the low-voltage battery 3, and terminates the processing. Here, the charge stop processing performed by use of electric power of the low-voltage battery 3 is, specifically, processing for terminating PLC communication, processing for determining whether there is deposition in the main contactors 22p, 22n, and processing for transmitting vehicle information to a server through an unillustrated telematics navigation system, for example.

Figure 6:
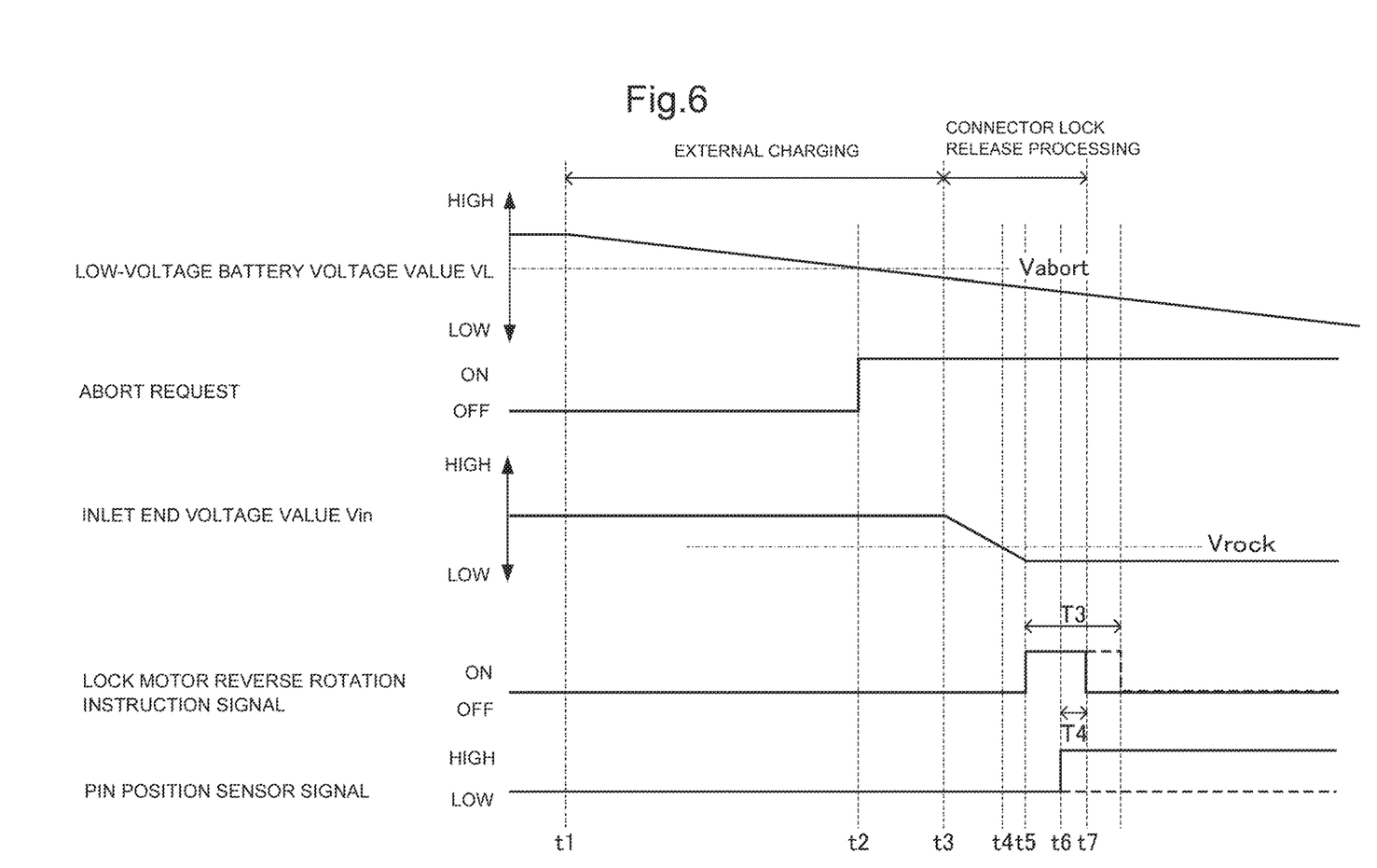
FIG. 6 is a time chart of the external charging abort processing.

FIG. 6 is a time chart of external charging abort processing. FIG. 6 illustrates a case where an anomaly occurs in the low-voltage battery 3 or the DC/DC converter 32 while performing external charging, and the low-voltage battery voltage value VL gradually starts to decrease from time t1. Here, examples of anomalies that cause a decrease in the low-voltage battery voltage value VL while performing external charging include disconnection of the low-voltage battery 3, short-circuit, and failure in a switching element of the DC/DC converter 32, for example.

The low-voltage battery voltage value VL gradually decreases from time t1, and is not higher than the charge abort threshold Vabort at time t2. Hence, at time t2, when the voltage value VL becomes not higher than the threshold Vabort (see S31 of FIG. 5), the charge ECU 60 requests abort of the external charging (see S32 of FIG. 5) to stop the supply of electric power from the power source 80. Upon receipt of the abort request, the external charging control device 81 reduces the output voltage of the power source 80 toward zero. Hence, the inlet end voltage value Vin starts to decrease from time t3.

Thereafter, at time t4, when the inlet end voltage value Vin becomes not higher than the lock release threshold Vrock, the charge ECU 60 determines that external charging is stopped (see S33 of FIG. 5).

Then, at time t5, when external charging is stopped, the charge ECU 60 starts connector lock release processing (see S34 of FIG. 5). More specifically, at time t5, the charge ECU 60 starts to transmit signals for rotating the lock motor 533 in the reverse direction to the driver. This rotates the lock motor 533 in the reverse direction, and starts to retract the lock pin 532 from the locked state side toward the unlocked state side. Thereafter, at time t6, when the lock pin 532 is retracted, the signal level of the pin position sensor 539 changes from "low" indicating the locked state to "high" indicating the unlocked state. Then, at time t7, when a continued time after release detection T4 passes after the signal level of the pin position sensor 539 switches to "high," the charge ECU 60 determines that the first release termination condition is satisfied and the connector locking mechanism 53 is switched from the locked state to the unlocked state, and therefore terminates the reverse rotation of the lock motor 533. Thus, the connector lock release processing is terminated.

FIG. 6 also illustrates, by a broken line, the change in signal that occurs when the connector lock release processing is terminated after the second release termination condition is satisfied. As indicated by the broken line in FIG. 6, even if the signal level of the pin position sensor 539 is not switched from "low" to "high" for some reason, when a release instruction continuation time T3 passes from time t5 at the start of the reverse rotation of the lock motor 533, the charge ECU 60 determines that the second release termination condition is satisfied and the connector locking mechanism 53 is switched from the locked state to the unlocked state, and therefore terminates the reverse rotation of the lock motor 533.

According to the power-supply unit 1 of the embodiment, the following effects can be achieved.

(1) When the feed connector 83 of the power source 80 is connected to the inlet 51 and electric power is supplied to at least one of the high-voltage battery 2 and the low-voltage battery 3 as a charge target, if the low-voltage battery voltage value VL becomes not higher than the charge abort threshold Vabort, the power-supply unit 1 stops the supply of electric power from the power source 80 to the charge target. With this, if some defect occurs in the low-voltage battery 3 and its voltage value VL drops while performing external charging by use of the power source 80, it is possible to stop the external charging of the charge target before the voltage value VL drops largely below the charge abort threshold Vabort. Hence, according to the power-supply unit 1, even if some defect occurs in the low-voltage battery 3 or its peripheral equipment and the voltage value VL thereof decreases, the external charging can be stopped with at least a voltage of about the charge abort threshold Vabort ensured in the low-voltage battery 3. Accordingly, after stoppage of the external charging, charge stop processing (processing of S34 to S35 in FIG. 5) can be performed appropriately by using the electric power of the low-voltage battery 3.

(2) The power-supply unit 1 includes the connector locking mechanism 53 that can, by driving the lock motor 533, switch between a locked state in which movement of the feed connector 83 in the pullout direction 832 is restricted, and an unlocked state in which this movement is not restricted. This can prevent the feed connector 83 from being unintentionally pulled out from the inlet 51 while connecting the feed connector 83 to the inlet 51 and performing external charging of the charge target. The power-supply unit 1 also drives the lock motor 533 by use of the electric power of the low-voltage battery 3, to perform connector lock processing of switching from the unlocked state to the locked state or connector lock release processing of switching from the locked state to the unlocked state. In a case of performing the connector lock processing or the connector lock release processing by use of electric power of the high-voltage battery 2 having a higher voltage than the low-voltage battery 3, the voltage of the high-voltage battery 2 needs to be stepped down, and power loss may increase. Meanwhile, the power-supply unit 1 can suppress power loss from performing the connector lock processing and the connector lock release processing. Also, as described above, in the power-supply unit 1, a voltage of about the charge abort threshold Vabort can be ensured, even when the voltage of the low-voltage battery 3 drops during external charging. Hence, according to the power-supply unit 1, even when some defect occurs in the low-voltage battery 3 or its peripheral equipment, the connector lock processing and connector lock release processing can be performed appropriately, whereby convenience can be increased. Accordingly, the power-supply unit 1 can improve convenience while suppressing power loss.

(3) When the low-voltage battery voltage value VL becomes not higher than the charge abort threshold Vabort during external charging, the power-supply unit 1 stops the supply of electric power from the power source 80 to the charge target, and then performs connector lock release processing. According to the power-supply unit 1, by performing the connector lock release processing in this order, it is possible to prevent the feed connector 83 from being pulled out from the inlet 51 with electric power still supplied from the power source 80 to the charge target. Additionally, according to the power-supply unit 1, even when the voltage of the low-voltage battery 3 drops during external charging, a voltage of about the charge abort threshold Vabort can be ensured at the time of stoppage of the external charging. Hence, after the stoppage of external charging, there is no fear of being unable to perform the connector lock release processing appropriately and being unable to pull out the feed connector 83 from the inlet 51.

(4) Even when an anomaly occurs in the DC/DC converter 32 that supplies electric power to the low-voltage battery 3 during external charging, the power-supply unit 1 continues without stopping the external charging of the charge target as long as the low-voltage battery voltage value VL is larger than the charge abort threshold Vabort. In other words, in the power-supply unit 1, even when an anomaly occurs in the DC/DC converter 32 that supplies electric power to the low-voltage battery 3, external charging of the high-voltage battery 2 can be continued, as long as the low-voltage battery voltage value VL is larger than the charge abort threshold Vabort.

(5) The power-supply unit 1 connects the power source 80 and the high-voltage battery 2 by the first power lines 21_p_, 21_n_, connects the first power lines 21_p_, 21_n_ and the low-voltage battery 3 by the second power lines 31_p_, 31_n_, and has the aforementioned DC/DC converter 32 provided in the second power lines 31_p_, 31_n_. With this configuration, electric power can be supplied to the low-voltage battery 3 from the power source 80 or the high-voltage battery 2 through the DC/DC converter 32. In addition, since the DC/DC converter 32 is provided in this position, charging of the high-voltage battery 2 can be continued even if an anomaly occurs in the DC/DC converter 32 during external charging.

Although an embodiment of the present invention has been described, the invention is not limited to this. Detailed configurations may be appropriately changed within the gist of the invention. For example, although the above embodiment is described by using the power source 80 that outputs direct current as the external power supply source, the invention is not limited to this. The invention may adopt an external power source that outputs alternating current as the external power supply source.

The invention claimed is:

1. A vehicle power-supply unit comprising:
a first electric storage device;
a second electric storage device having a lower voltage than the first electric storage device;
an inlet to which a connector of a power-supply unit can be connected so as to supply electric power from an external power supply source to a charge target which is at least any one of said first electric storage device and said second electric storage device;
a charge controller configured to control the supply of the electric power for charging of said charge target; and
a voltage detector configured to detect a voltage of said second electric storage device, wherein
when it is detected that the voltage value of said second electric storage device detected becomes a predetermined charge stop threshold or smaller than the predetermined charge stop threshold in a state where said connector is connected to said inlet and the electric power is supplied from said external power supply source to said charge target, said charge controller performs charge stop processing that stops the supply of electric power from said external power supply source to said charge target by utilizing the electric power of the second electric storage device so as to terminate the charge stop processing.

2. The vehicle power-supply unit according to claim 1, further comprising:
a lock mechanism capable of switching between a locked state that restricts said connector to move in a pullout direction and an unlocked state that does not restrict said movement of said connector in the pullout direction, in a state where the connector is connected to said inlet; and
an electromagnetic actuator that drives a lock mechanism to perform said switching, wherein
said charge controller drives said electromagnetic actuator by utilizing the electric power from said second electric storage device to perform the switching from said unlocked state to said locked state or the switching from said locked state to said unlocked state.

3. The vehicle power-supply unit according to claim 2, wherein
when it is detected that the voltage value of said second electric storage device becomes said charge stop threshold or smaller, said charge controller stops the supply of electric power from said external power supply source to said charge target and then performs the switching to the unlocked state.

4. The vehicle power-supply unit according to claim 1, further comprising:
a power converter configured to convert input electric power and supply it to said second electric storage device; and
an anomaly detector configured to detect an anomaly in said power converter, wherein
even when the anomaly is detected in said power converter when the electric power is supplied from said external power supply source to said charge target, said charge controller continues the supply of the electric power from said external power supply source to said charge target, as long as the voltage value of said second electric storage device is larger than said charge stop threshold.

5. The vehicle power-supply unit according to claim 4, further comprising:
a first power line that connects said external power supply source and said first electric storage device; and
a second power line that connects said first power line and said second electric storage device, wherein
said power converter is provided in said second power line.

6. The vehicle power-supply unit according to claim 4, wherein
the electric power of said first electric storage device is supplied to said second electric storage device through said power converter.

* * * * *